(12) United States Patent
Williams

(10) Patent No.: US 9,971,551 B2
(45) Date of Patent: May 15, 2018

(54) PREVISUALIZATION FOR LARGE FORMAT PRINT JOBS

(75) Inventor: Leon Calvin Williams, Walworth, NY (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 1245 days.

(21) Appl. No.: 12/925,945

(22) Filed: Nov. 1, 2010

(65) Prior Publication Data

US 2012/0105431 A1  May 3, 2012

(51) Int. Cl.
  *G06F 3/12* (2006.01)
  *G06T 15/50* (2011.01)
  *G06T 19/00* (2011.01)

(52) U.S. Cl.
  CPC .......... *G06F 3/1208* (2013.01); *G06F 3/1256* (2013.01); *G06T 15/50* (2013.01); *G06T 19/00* (2013.01); *G06F 3/1219* (2013.01)

(58) Field of Classification Search
  None
  See application file for complete search history.

(56) References Cited

U.S. PATENT DOCUMENTS

| | | | |
|---|---|---|---|
| 6,229,546 B1* | 5/2001 | Lancaster et al. | 345/419 |
| 6,263,119 B1* | 7/2001 | Martucci | 382/298 |
| 7,542,034 B2* | 6/2009 | Spooner et al. | 345/419 |
| 8,705,139 B1* | 4/2014 | Snyder et al. | 358/3.27 |
| 2002/0112025 A1* | 8/2002 | Johansson et al. | 709/217 |
| 2003/0107569 A1* | 6/2003 | Endo et al. | 345/419 |
| 2003/0117391 A1* | 6/2003 | Olano | 345/419 |
| 2003/0197716 A1* | 10/2003 | Krueger | 345/629 |
| 2004/0010756 A1* | 1/2004 | Hobbs | 715/526 |
| 2005/0052717 A1 | 3/2005 | Brotherton-Radcliffe et al. | |
| 2006/0055956 A1* | 3/2006 | Takahashi et al. | 358/1.13 |
| 2007/0078989 A1 | 4/2007 | van Datta et al. | |
| 2007/0165035 A1 | 7/2007 | Duluk, Jr. et al. | |
| 2007/0211269 A1* | 9/2007 | Patrick | H04N 1/6011 358/1.9 |
| 2007/0240042 A1* | 10/2007 | Sato | 715/527 |
| 2007/0296718 A1* | 12/2007 | Tzruya et al. | 345/418 |
| 2008/0053306 A1 | 3/2008 | Lofink et al. | |
| 2008/0055306 A1* | 3/2008 | Kwok et al. | 345/419 |
| 2008/0201113 A1 | 8/2008 | Stenacker | |
| 2011/0075200 A1* | 3/2011 | Goldwater et al. | 358/1.15 |

FOREIGN PATENT DOCUMENTS

CN  1932754  3/2007

* cited by examiner

*Primary Examiner* — William Beutel
(74) *Attorney, Agent, or Firm* — Perkins Coie LLP

(57) ABSTRACT

Large format print jobs are previsualized in context. A print job source image is received. At least one 3D environment is received, including one or more designated insertion sites to receive the print job source image. One or more images or videos are produced, visualizing the 3D environment with the print job source image integrated into one or more of the designated insertion sites.

12 Claims, 6 Drawing Sheets

400

PREVISUALIZATION FOR LARGE FORMAT PRINT JOBS

COPYRIGHT NOTICE

A portion of the disclosure of this patent application contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

REFERENCE TO COMPUTER PROGRAM LISTING APPENDIX ON COMPACT DISC

Computer program listings are contained on compact disc submitted with the filing of this application. These include (1) Appendix A.pdf, created on Sep. 25, 2010, occupying 15 Kb, and (2) Appendix B.pdf, created on Sep. 25, 2010, occupying 31 Kb. The entirety of these program listings is hereby incorporated by reference into the present document.

BACKGROUND OF THE INVENTION

1. Field of the Invention

The invention relates to three dimensional (3D) modeling using computer graphics. More particularly, the invention concerns a method for 3D modeling of a proposed large format print with a realistic environment, perspective, animation and lighting.

2. Description of the Related Art

Large format printers are widely used today. One such printer is the VUTEk GS3200™ model produced by EFI™ of Foster City, Calif., USA. The GS3200™ model is a super wide printer that produces photorealistic prints on rolls or boards. As is apparent to one skilled in the art, super wide printers can print super wide format prints that are between 2 meters and 5 meters wide. The print output is more than three meters wide with a resolution of more than one thousand DPI resolution, and can use up to eight colors plus white.

Printers such as these are popular for billboards, "wraps" for city busses and other vehicles, banners, building wraps, trade show exhibits, and the like. However, such printers use a substantial amount of media and ink, and the cost of the final output is significant. Therefore, if there is a possibility that the final printed product does not look exactly right when installed in the intended application, this comes with a financial risk to the paying customer.

To address this, sometimes people preview the printing job on a computer screen. But this approach lacks context for the customer to see how the large format job will look in the real world. With some print jobs, customers view a print output in a light booth to simulate lighting conditions that may be encountered in the real world. Due to the small size of such light booths, these only accommodate small samples, so the full effect of the proposed signage is still difficult to assess. And this approach still does not permit one to view the print job in its intended context.

Thus, the paradox is that print customers would like to view a completed print job as applied in its intended context before actually committing to printing. However, the only way to guarantee that a job will satisfy the customer is to print the job, install it in its intended environment, and then evaluate the print job in situ. By that time, it is too late to decide that the source image must be changed, since printing has already occurred. Due to these unsolved problems, large format printing can be accompanied by difficulties.

SUMMARY OF THE INVENTION

Broadly, some embodiments in the present disclosure concern previsualization of large format print jobs in context. A print job source image is received. At least one 3D environment is received, including one or more designated insertion sites to receive the print job source image. One or more images or videos are produced, visualizing the 3D environment with the print job source image integrated into one or more of the designated insertion sites.

The invention may be implemented in the form of a system, method, programmed product, circuitry, or any combination of these.

DETAILED DESCRIPTION

The nature, objectives, and advantages of the invention will become more apparent to those skilled in the art after considering the following detailed description in connection with the accompanying drawings.

Hardware Components and Interconnections

Overall Structure

Figure 1:
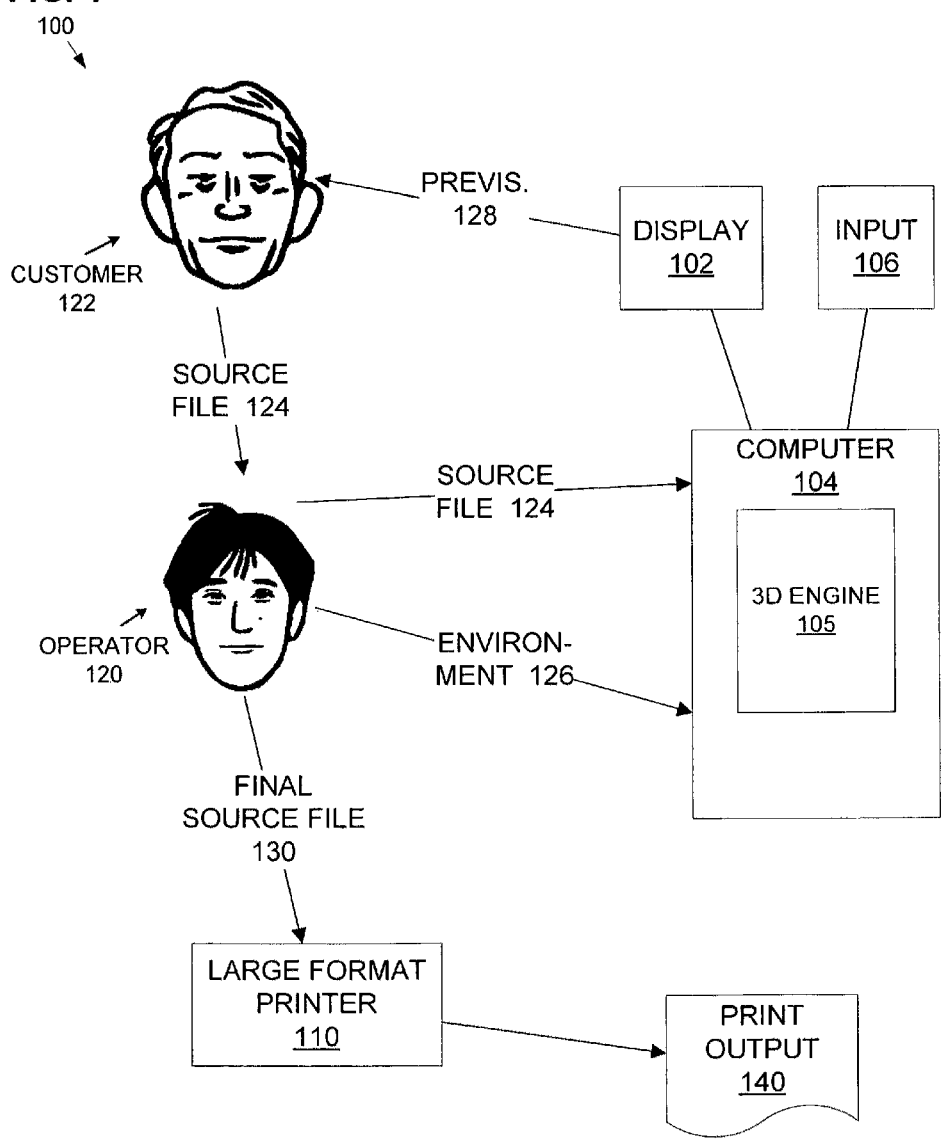
FIG. 1 is a block diagram of an operating environment including relevant hardware components and interconnections according to one embodiment of the invention.

FIG. 1 shows an exemplary operating environment 100. A computer 104 may be implemented by a desktop computer, notebook, computer workstation, mainframe, mobile device, slate computing machine, or any other digital data processing machine with suitable computing power to carry out the tasks discussed herein. The computer 104 presents text and graphics upon a display 102, which is an LCD display, stereoscopic display, CRT display, or other suitable color display capable of presenting graphics, video, and text with suitable resolution for the tasks described herein. The display 102 may be integrated into the computer 104, or not. Various forms of user input 106 may be provided, such as a mouse, trackball, digitizing pad, foot pedal, joystick, touch screen, eye gaze tracking module, microphone, or other mechanism for reducing human user input to machine-readable form. As explained in greater detail below, the computer 104 includes a 3D engine 105.

Basically, an operator 120 manipulates the computer 104 on behalf of a customer 122. The operator 120 accepts the customer's source file 124, containing a machine-readable description of large format signage imagery that the customer wishes to print on a large format printer 110, and inputs the source file 124 into the computer 104. The operator 120 provides a 3D environment 126 to the computer 104. The computer 104, and specifically the 3D engine, prepares a previsualization 128, which depicts the large format signage in the realistic setting of the environment 126, including perspective, animation and lighting selected by the operator 120. This permits the customer 122 to change the source file 124 if the previsualized output 128 reveals some flaws in the signage. Upon customer approval of the previsualized output 128, which may be revised if needed, the operator 120 sends the final source file 130 to the printer 110, which creates a print output 140.

Exemplary Digital Data Processing Apparatus

Figure 2:
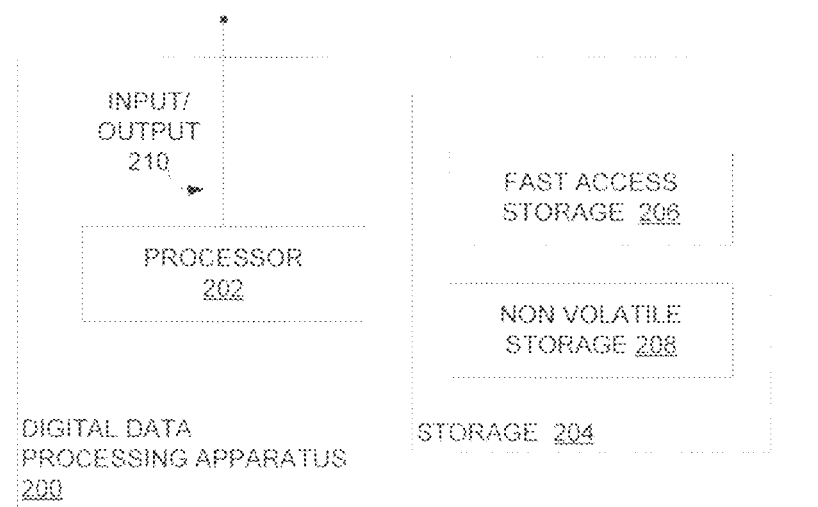
FIG. 2 is a block diagram of a digital data processing machine according to one embodiment of the invention.

Data processing features of entities such as the computer 104 or 3D engine 105 or printer 110 may be implemented in various forms. FIG. 2 shows one example, in the form of a digital data processing apparatus 200. The apparatus 200 may be implemented by a personal computer, customer circuit board, workstation, notebook computer, controller, microcontroller, state machine, or other processing machine appropriate to the requirements of the tasks explained herein. The apparatus 200 includes a processor 202, such as a microprocessor, controller, microcontroller, digital signal processor (DSP), application specific integrated circuit (ASIC), field programmable gate array (FPGA) or other programmable logic device, discrete gate or transistor logic, discrete hardware components, or any combination thereof designed to perform the functions described herein. The processor 202 may also be implemented as a combination of computing devices, such as a combination of a DSP and a microprocessor, a plurality of microprocessors, one or more microprocessors in conjunction with a DSP core, or any other such configuration.

Figure 3:
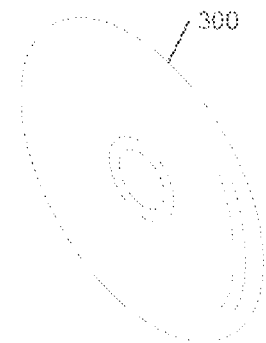
FIG. 3 shows an exemplary storage medium according to one embodiment of the invention.

The processor is coupled to digital data storage 204. In the present example, the storage 204 includes a fast-access storage 206, as well as nonvolatile storage 208. The fast-access storage 206 may be used, for example, to store the programming instructions executed by the processor 202. The storage 206 and 208 may be implemented by various devices, such as those discussed in greater detail in conjunction with FIGS. 3 and 4. Many alternatives are possible. For instance, one of the components 206, 208 may be eliminated; furthermore, the storage 204, 206, and/or 208 may be provided on-board the processor 202, or even provided externally to the apparatus 200.

The apparatus 200 also includes an input/output 210, such as a connector, line, bus, cable, buffer, electromagnetic link, network, modem, transducer, IR port, antenna, or other means for the processor 202 to exchange data with other hardware external to the apparatus 200.

Storage Media

As mentioned above, various instances of digital data storage may be used, for example, to provide storage used by the computer 104, printer 110, and/or 3D engine 105 (FIG. 1), to embody the storage 204 and 208 (FIG. 2), etc. Depending upon its application, this digital data storage may be used for various functions, such as storing data, or to store machine-readable instructions. These instructions may themselves aid in carrying out various processing functions, or they may serve to install a software program upon a computer, where such software program is then executable to perform other functions related to this disclosure.

In any case, the storage media may be implemented by nearly any mechanism to digitally store machine-readable signals. One example is optical storage such as CD-ROM, WORM, DVD, digital optical tape, disk storage 300 (FIG. 3), or other optical storage. Another example is direct access storage, such as a conventional "hard drive," redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor can read information from, and write information to, the storage medium. In the alternative, the storage medium may be integral to the processor. In another example, the processor and the storage medium may reside in an ASIC or other integrated circuit.

Logic Circuitry

In contrast to storage media that contain machine-executable instructions, as described above, a different embodiment uses logic circuitry to implement data processing features of entities such as the computer 104, printer 110, and/or 3D engine 105. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Figure 4:
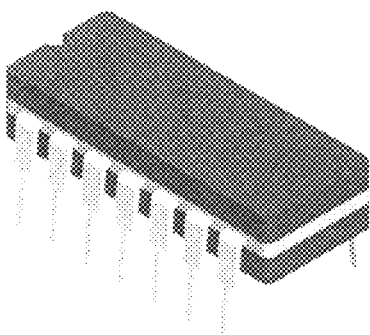
FIG. 4 is a perspective view of exemplary logic circuitry according to one embodiment of the invention.

FIG. 4 shows an example of logic circuitry in the form of an integrated circuit 400.

Operation

Having described the structural features of the present disclosure, the operational aspect of the disclosure will now be described. The steps of any method, process, or algorithm described in connection with the embodiments disclosed herein may be embodied directly in hardware, in a software module executed by hardware, or in a combination of the two.

Overall Sequence of Operation

Intro

Figure 5:
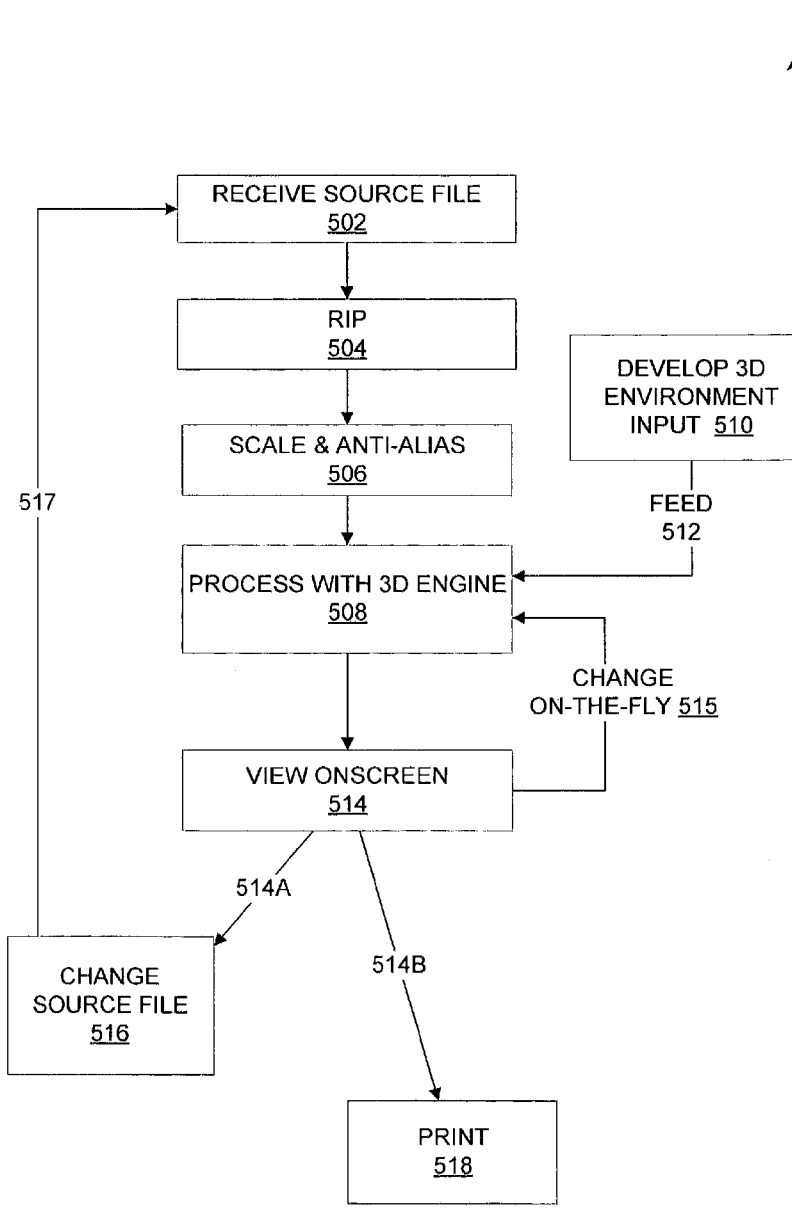
FIG. 5 is a flowchart of an operational sequence for previsualizing large format print jobs in context according to one embodiment of the invention.

FIG. 5 shows an exemplary operating sequence 500, which is for exemplary purposes described in the context of the environment 100 of FIG. 1. In step 502, the computer 104 receives the source file 124 from the operator 120. The source file 124 may be provided by inserting a diskette or CD or circuit memory or other storage, by downloading one or more files with a wireless or wired connection, or by performing any known data transfer technique. In one example, the source file 124 comprises a machine-readable document representing an image in vector-based format using geometric primitives such as points, lines, curves, and polygons used to represent images in computer graphics. Some exemplary vector-based image formats include PDF and Postscript. Some other exemplary vector-based formats include CGM, SVG, AI, CDR, EPS, ODG, PGML, SWF, VML, WMF (or EMF), and XPS. As an alternative, a pixel based image format may be used, such as JPEG, EXIF, TIFF, RAW, PNG, GIF, BMP, and the like.

Figure 6:
FIG. 6 is a screenshot of source image according to one embodiment of the invention.

The image of FIG. 6 shows one example 600 of a customer's source file 124, not in machine-readable format, but as the result of such a source file 124 being input to a computer and displayed. Thus, the image 600 of FIG. 6 is a screenshot of the customer's source image. In this particular example, the displayed image 600 is the result of the source file 124 being viewed with a commercially available program called Autodesk 3ds™.

RIP

In step 504, the computer 104 applies raster image processing (RIP) to create a bitmap from the source file 124. This means that the source file 124 is converted into a pixel-based image from a vector-based format. Some exemplary pixel-based formats include JPEG, EXIF, TIFF, RAW, PNG, GIF, BMP, and the like. In one example, step 504 converts the source file 124 into pixels encoded as CMYK (or more if 8 colors and white are used) bits. Step 504 may use a commercially available raster processing engine such as the Adobe™ Print Engine, along with custom added software components. Raster image processing is well known across various disciplines in the field of computer graphics.

In the event that the source file 124 employs a pixel-based format instead of vector-based format, then step 504 need not perform raster image processing. In Continuing with the same example described above, step 504 would encodes the pixel-based source image in CMYK bits as explained above.

Scale & Anti-Alias

In step 506, the computer 104 applies scaling and anti-aliasing to the raster image from step 504. Scaling refers to resizing the raster image to a size appropriate to the portion of the display 102 that the image will occupy. Scaling algorithms are well known across various disciplines in the field of computer graphics.

Anti-aliasing refers to techniques to minimize distortion when representing a high-resolution image at lower resolution. In one respect, anti-aliasing includes removing signal components with a higher frequency that can be properly presented on the display 102. Anti-aliasing techniques are well known across various disciplines in the field of computer graphics.

In the present example, the result from step 506 is a JPEG file named sign2.jpg. FIG. 6 shows a screenshot 600 illustrating the display of this file, which depicts a billboard in this example.

Create 3D Environment

In step 510, the computer operator 120 directs the computer 104 to develop the 3D environment 126. What is meant by "3D" in this context is a projection of various three-dimensional constructs upon a two-dimensional plane. In one example, the environment 126 is developed with a commercially available 3D modeling, animation, rendering, and compositing program such as Autodesk 3ds™. In this particular example, the 3D environment 126 from step 510 comprises a machine-readable file of 3DS format. The 3D environment 126 is 3D in the sense that it describes objects in three dimensions. However, as discussed below, this 3D structure will be projected onto a two-dimensional plane for presentation on the display 102.

In one example, the 3D environment 126 includes components of scene, material, mesh, and skeleton. These components are specifically formatted to be compatible with the 3D engine 105. The scene file describes how all the pieces of the scene fit together. The scene component in the current example is embodied by XML code. Appendix B shows the contents of a material input according to one example.

The material is defined in a procedural statement that establishes the makeup of the components of the environment, for example, metal, wood, glass, and the like. The material file describes the lighting, bitmaps, and processing technique used to render a scene. The material file in this example comprises a procedural language such as "C" or a custom language particular to the 3D engine 105. Appendix A shows the contents of a material input according to one example. The material file references the processed, user-supplied source file from 506. In this case, this reference is effected by the material file naming or pointing-to the modified source file from step 506, which in this example is named sign2.jpg. This reference illustrates how the billboard contents can be replaced by replacing the referenced source file.

The mesh file is a binary file defining 3D coordinates in space to describe various triangles or other polygons, and thereby define the surfaces of the environment in three dimensions. In one example, the mesh is created using the open source Object-Oriented Graphics Rendering Engine (OGRE), also called OGRE-3D.

The skeleton file is a binary file illustrating the fundamental structure beneath the surface of environment components. The skeleton file defines components that are not movable, such as grass, buildings, terrain, and the like. Further, the skeleton defines components with parts that move relative to each other, such as a person, robot, animal, machine, and the like.

Figure 7:
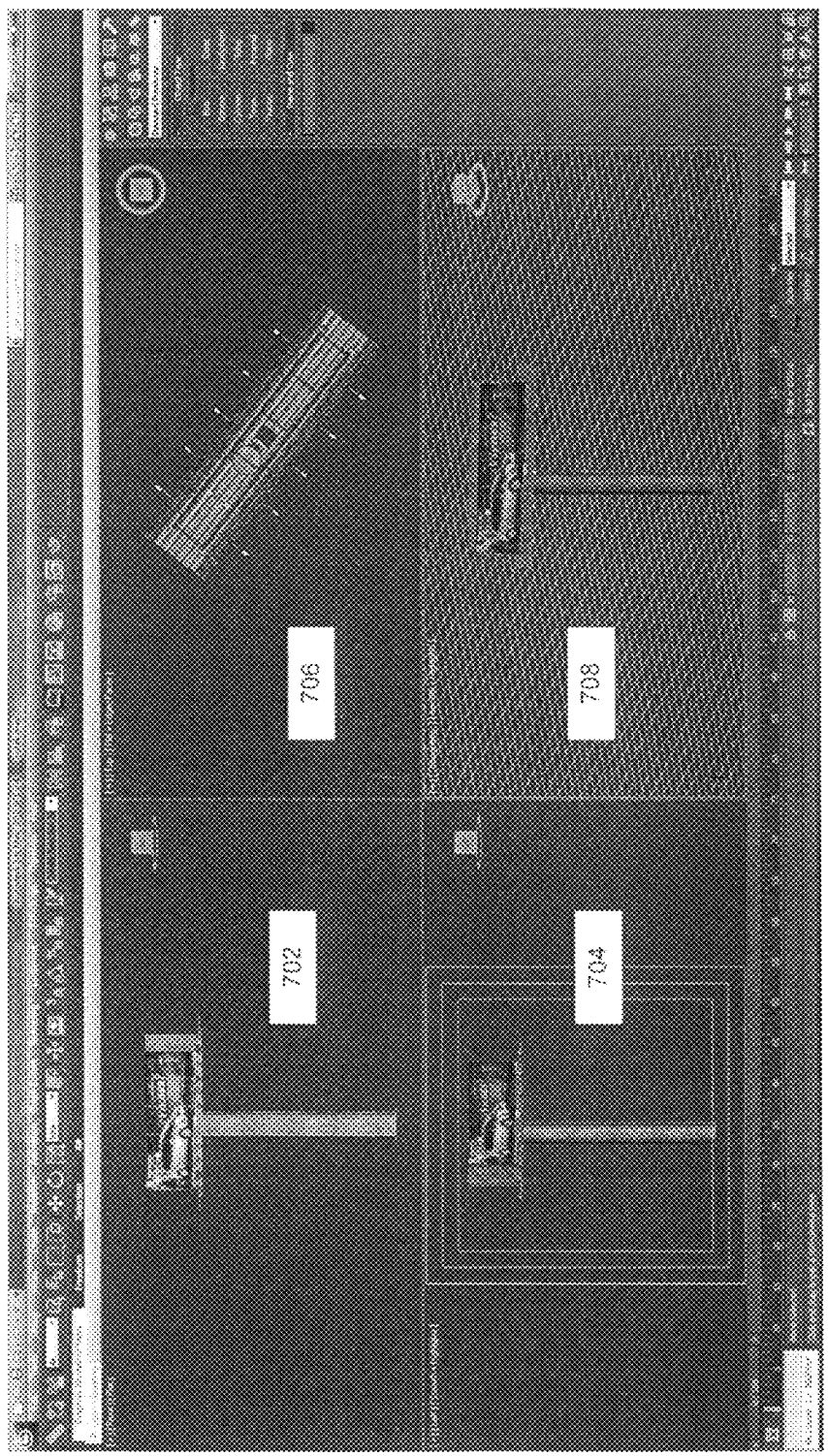
FIG. 7 is a screenshot of some exemplary background components according to one embodiment of the invention.

FIG. 7 shows an example of one component of the 3D environment 126 as displayed on a screen, including a billboard post, lights, catwalk, and frame. To provide added perspective, the environment is shown together with the customer supplied source file, which in this case is the billboard shown in FIG. 6. These are depicted in various perspective views 702, 704, 708 as well as a top plan view 706.

The environment 126 includes one or more designated locations, such as may be defined by 3D coordinates, for insertion of source images such as the source image 124. For example, the environment 126 of a rural highway scene may include a billboard, where the presentation area of the billboard is defined in 3D coordinates as an insertion site for a source image.

3D Processing

In step 512, the 3D environment 126 is fed to the computer 104. If the computer 104 was also used to prepare the 3D environment, then step 512 may be by internal operations of the computer 104. In a different example, the computer 104 may receive the 3D environment from the operator 120 providing a diskette or CD or circuit memory or other storage to the computer 104. Another example is where the computer 104 downloads one or more files from a remote computer that created the environment 126, this download being performed the by wireless or wired connection or by performing a different data transfer technique.

After step 512, the computer 104 directs the 3D engine 105 to process the image from 506 along with the 3D environment 126 from step 510. In the present example, the image from 506 is a JPEG file named sign2.jpg, as mentioned above. Additional user-supplied inputs to the task 508 may include parameters such as some or all of camera angle, camera track, perspective, lighting magnitude, lighting color, and the like. Other inputs may be defined and input to step 508 if desired.

In the illustrated example, the 3D engine 105 is a processing component of the computer 104, implemented in software, hardware, firmware, or a combination of these. In one example, the 3D engine 105 employs the OGRE product mentioned above, with further components added or modified using a graphics user interface package such as OpenGL or DirectX.

In step 508, the 3D engine 105 prepares a visualization of the customer's signage in a realistic scene by preparing a composite scene incorporating the customer signage (as rasterized, scaled, and anti-aliased in steps 504, 506, 508) into the 3D environment 126 from step 510. The 3D engine 105 also computes a projection of the resultant 3D structure onto a two-dimensional plane for presentation upon the display 102.

If the camera angle and track and perspective are static, then step 508 produces a static image such as JPEG file. If the camera properties are dynamic or elements in the scene file are animated, then the output of step 508 comprises a video such as an AVI or WMV or MOV file.

True 3D

In one embodiment, the 3D engine 105 in step 508 performs further operations to present the final output in true 3D, as opposed to 3D objects projected onto a two dimensional screen. Here, the 3D engine 105 performs additional computations to render the 3D model in a stereoscopic simulation. Thus, viewers with polarized or shutterized glasses can view the final output in true 3D.

One exemplary paper that addresses the process of creating a stereoscopic rendering of a 3D model is found in the white paper *NVIDIA 3D VISION PRO AND STEROSCOPIC 3D*, No. WP-05482-001_v01, October 2010, which is hereby incorporated herein its entirety.

Default Lighting

In one implementation of the process 500, step 508 includes application of a default or user-selected lighting scheme. Lighting options may include diffuse or specular lighting, as well as different options for ambient lighting such as daylight, cloudy, night, sodium lighting, fluorescent, tungsten, mercury, or a user-selected temperature Kelvin such as 5000 K (also known as D50). In one embodiment, if the scene is intended to depict daylight, then an ambient lighting of D50 daylight is automatically used. Thus, the screen visualization simulates an approximation of spectral response of ambient (or user-selected) light upon the particular material and ink of the printed substrate.

Although not known for use in the present context, there are various publications concerning the process of adjusting lighting in an image, which techniques may be incorporated into step 508. One example is the paper *The reproduction of Colour*, by Dr. R. W. G. Hunt, Fountain Press, Fourth Edition 1987, which is hereby incorporated herein by reference in its entirety.

Presentation

In step 514, the computer 104 presents the result from step 508 upon the display 102 for viewing by the customer 122. If the product of step 508 is a static image, then step 514 presents the image on the display 102. If the product of step 508 is a video, then step 514 plays the video on the display 102.

Figure 8:
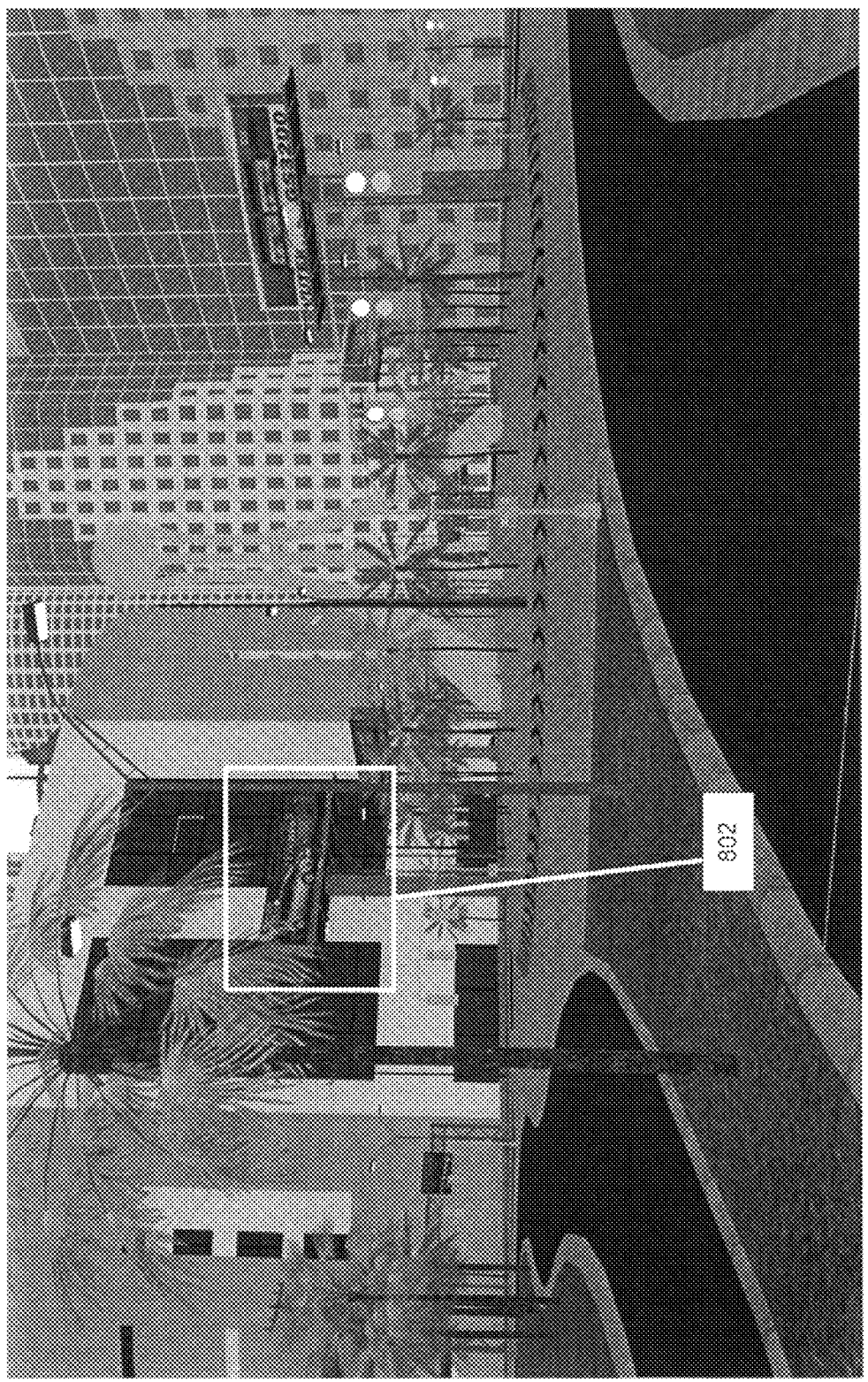
FIG. 8 is a screenshot of an exemplary 3D engine output according to one embodiment of the invention.

FIG. 8 shows an example of a static image presented in step 514. The image includes a realistic environment based on the environment 126, with the customer-supplied source file 124 (as rasterized, scaled, and anti-aliased in steps 504, 506, 508) shown in situ at 802.

Alternative Environments

In one embodiment, the process 500 considers and presents the customer's signage in multiple, alternative environments. Here, step 510 first prepares, designates, or otherwise establishes multiple alternative environments. For example, environments may pertain to a city view, interstate or rural view, suburban view, and the like. These may employ multiple alternative environments 126, separately prepared and loaded to the computer 104, for example.

Then, the 3D engine 105 in step 514 separately integrates the processed source image from step 508 with each of the alternative environments. This results in alternative outputs 514, each showing a different one of the environments with the source file integrated into predetermined insertion spots therein. In step 514, the different visualizations may be presented separately, or shown in different windows of the same screen of the display 102.

Change On-the-Fly

During the operation 514 of viewing the processed composite image on the display 102, the computer 104 is able to change the composite image substantially in real time as shown by 515. Namely, responsive to input from the operator 120, the computer 104 re-processes 515/508 the image in order to adjust some or all of the operator-defined parameters of the rendering from the previous performance of step 508, such as camera angle, camera track, perspective, lighting magnitude, and lighting color. In one example, user inputs are supplied via a graphical user interface, with various mouse and or keyboard commands serving to enter camera positions, define track, and establish or change the properties of an automated walkthrough.

Revise

If the 3D rendering of the customer's signage reveals some necessary changes, as depicted by 514a, then the customer changes the source file in step 516. The customer may carry out step 516, for example, by using a program such as Adobe Illustrator™ to change the source file. Then, in step 512, operator 120 enters the revised source into the computer 104, whereupon the process 500 starts over at step 502.

Print

When the customer 122 is satisfied with the previsualization of the signage, as depicted by 514b, then the operator 120 in step 518 causes the computer 104 or a different computer or the printer 110 itself to make a print 140 of the image represented by the most recent version of the processed customer's source file from step 506. In the present example, printing 518 is carried out using a large format printer such as the VUTEk GS3200™ model.

Other Embodiments

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

What is claimed is:

1. A method for previsualizing large format print jobs in context, comprising operations of:
   receiving, by a computer, a print job source image;
   receiving, by the computer, at least one 3D environment that includes a virtual representation of a display site derived from an image of the display site, wherein the display site is a real world site for displaying a printed image of the print job source image;

enabling, by the computer, a user to iteratively edit the print job source image, wherein the user is able to view, while a virtual representation of the printed image is being displayed at the virtual representation of the display site, a 2D visualization of a particular perspective of the virtual representation of the printed image and at least a portion of the virtual representation of the display site surrounding the virtual representation of the printed image, the particular perspective being one of a plurality of perspectives of the virtual representation of the printed image that can be viewed by use of the computer displaying, by the computer, the 2D visualization of the particular perspective of the virtual representation of the printed image; and editing, by the computer, the print job source image.

2. The invention of claim 1, the operations further comprising employing a raster image processor to create a bit map from the print job source image, and scaling and anti-aliasing the bit map;

where the operation of enabling the user to iteratively edit the print job source image includes integrating the scaled and anti-aliased bit map into the 3D environment.

3. The invention of claim 1, the operations further comprising creating the 3D environment;

where the 3D environment is defined by machine-readable descriptions including all of: scene, material, mesh, and skeleton.

4. The invention of claim 1, where:

each of the perspectives can be viewed under multiple lighting conditions.

5. The invention of claim 1, the operations further comprising producing a video of the virtual representation of the printed image being displayed at the virtual representation of the display site, the virtual representation of the printed image to appear as it would appear when printed on a particular material with a particular ink and placed at a particular perspective with a particular lighting.

6. The invention of claim 5, where:

the operations further include receiving input parameters defining properties of the produced video including at least one of: camera position, camera angle, camera track, perspective, lighting amount, lighting color; and the producing operation is performed according to the input parameters.

7. The invention of claim 5, the operations further comprising:

receiving input parameters defining properties of the produced video including at least one of camera position, camera angle, camera track, perspective, lighting amount, lighting color, where the producing operation is performed according to the input parameters; and displaying the produced video, and during display of the produced video, changing display of the produced video on-the-fly responsive to received changes to the input parameters.

8. The invention of claim 5, where:

the receiving operation includes receiving multiple 3D environments where each of the 3D environments includes a designated display site to receive the print job source image;

the operations further include receiving selection of one of the multiple 3D environments; and the producing operation produces the video of the virtual representation of the printed image being displayed at the designated display site of the selected 3D environment.

9. The invention of claim 5, where:

the producing operation includes producing the video of the virtual representation in stereoscopic simulation.

10. A non-transitory computer readable storage medium containing a program executable to perform the operations of claim 1.

11. A non-transitory computer readable storage medium containing a program to install machine-readable instructions on a computer, where the instructions are executable to perform the operations of claim 1.

12. An apparatus for previsualizing large format print jobs in context, comprising:

a display;

one or more user input devices; and coupled to the display and user input, a processor programmed to perform the operations of claim 1.

* * * * *